(12) United States Patent
Ebata et al.

(10) Patent No.: US 7,552,034 B2
(45) Date of Patent: Jun. 23, 2009

(54) METHOD AND COMPUTER PROGRAM FOR USE IN LOCATING WIRELESS BASE STATIONS IN A MOBILE COMMUNICATIONS SYSTEM

(75) Inventors: Koichi Ebata, Tokyo (JP); Hiroshi Furukawa, Tokyo (JP)

(73) Assignee: NEC Corporation, Tokyo (JP)

( * ) Notice: Subject to any disclaimer, the term of this patent is extended or adjusted under 35 U.S.C. 154(b) by 984 days.

(21) Appl. No.: 10/465,605

(22) Filed: Jun. 20, 2003

(65) Prior Publication Data

US 2003/0236092 A1 Dec. 25, 2003

(30) Foreign Application Priority Data

Jun. 20, 2002 (JP) ............................. 2002-179956

(51) Int. Cl.
*G06F 17/50* (2006.01)
*H04Q 7/36* (2006.01)

(52) U.S. Cl. .............................. 703/2; 703/17; 455/431; 455/446; 342/357.09; 370/238

(58) Field of Classification Search ..................... 703/2, 703/13, 17, 19; 455/431, 446; 342/357.09; 340/572.1; 370/238
See application file for complete search history.

(56) References Cited

U.S. PATENT DOCUMENTS

| | | | | |
|---|---|---|---|---|
| 5,526,357 A | * | 6/1996 | Jandrell | 370/346 |
| 5,715,516 A | * | 2/1998 | Howard et al. | 455/422.1 |
| 5,802,173 A | * | 9/1998 | Hamilton-Piercy et al. | 379/56.2 |
| 5,815,813 A | * | 9/1998 | Faruque | 455/446 |
| 5,960,343 A | * | 9/1999 | Ray et al. | 455/431 |
| 5,987,328 A | * | 11/1999 | Ephremides et al. | 455/446 |
| 6,360,094 B1 | * | 3/2002 | Satarasinghe | 455/423 |
| 6,400,955 B1 | * | 6/2002 | Kawabata et al. | 455/450 |
| 2002/0024935 A1 | * | 2/2002 | Furukawa et al. | 370/238 |
| 2002/0137517 A1 | * | 9/2002 | Williams et al. | 455/444 |
| 2002/0167954 A1 | * | 11/2002 | Highsmith et al. | 370/406 |
| 2003/0146871 A1 | * | 8/2003 | Karr et al. | 342/457 |
| 2003/0222819 A1 | * | 12/2003 | Karr et al. | 342/457 |
| 2003/0222820 A1 | * | 12/2003 | Karr et al. | 342/457 |
| 2004/0136342 A1 | * | 7/2004 | Pedersen et al. | 370/335 |
| 2004/0235484 A1 | * | 11/2004 | Korpela et al. | 455/446 |

FOREIGN PATENT DOCUMENTS

| | | |
|---|---|---|
| JP | 7-23444 | 1/1995 |
| JP | 9-55697 | 2/1997 |
| JP | 2001-169342 | 6/2001 |
| WO | WO 00/11807 | 3/2000 |

OTHER PUBLICATIONS

Japanese Office Action dated Feb. 21, 2005 (and English translation of relevant portion).

* cited by examiner

*Primary Examiner*—Thai Phan
(74) *Attorney, Agent, or Firm*—Dickstein Shapiro LLP

(57) ABSTRACT

When locating base stations which are wirelessly coupled with each other and establish one or more inter-cell wireless relay routes in a mobile communications system, the heights of directional antennas to be installed at the base stations are determined so as to be different, which base stations are adjacent with each other in a given inter-cell wireless relay route.

16 Claims, 4 Drawing Sheets

METHOD AND COMPUTER PROGRAM FOR USE IN LOCATING WIRELESS BASE STATIONS IN A MOBILE COMMUNICATIONS SYSTEM

BACKGROUND OF THE INVENTION

1. Field of the Invention

The present invention relates generally to technologies for use in designing or locating base stations coupled over a wireless communications link in a cellular mobile system, and more specifically to a method and computer program for effectively suppressing interference at non-targeted base station in an inter-cell wireless communications link.

2. Description of Related Art

When locating base stations in cellular mobile service areas, it is a current practice to previously conduct a computer simulation to determine the number of base stations and the locations thereof considering a variety of factors. These factors includes, for example, transmission power of each base station, the transmission power of mobile terminals located in each prospective service area, a maximum predicted number of calls, cell sizes, radio wave propagation characteristics depending on terrain and man-made conditions, etc.

Such a computer simulation is typically iterated until eliminating dead spots or reducing such spots to an acceptable extent. These simulations may also be carried out when adding a new base station(s) to the existing service areas or when splitting a busy original cell into smaller ones.

In order to attain effective service coverage, it is usual to construct the base stations high on tall buildings or tall poles.

As is known, it is a current practice to directly couple, using copper wires, optical fiber cables, etc., a plurality of base stations to a local control station in a core network. However, the wire or optical fiber connection of each base station to the core network is usually not economical, and sometimes, practically difficult due to severe terrain conditions (for example). One approach to addressing such difficulties is to wirelessly connect a plurality of base stations while one or more base stations thereof are directly connected to the core network via optical cables (for example).

Before turning to the present invention, it is deemed preferable to describe, with reference to FIGS. 1 and 2, a conventional technology relevant to the present invention.

FIG. 1 is a diagram schematically showing one example of a plurality of service areas which are defined by ellipses in this particular case and are respectively covered by core base stations 10(1)-10(3) and wirelessly linked base stations 12(1)-12(14). In the instant disclosure, each of the core base stations such as 10(1)-10(3) implies a base station which is directly coupled to a core network 14 by way of optical fiber cables 16 (for example) and also coupled wirelessly to the adjacent base stations, and each of the wirelessly linked base stations 12(1)-12(14) implies a base station which is wirelessly coupled to an adjacent base station(s). As is known, the core network 14 includes a wire-line network such as a public switched communications network, IP (Internet Protocol) network, the Internet, etc.

In FIG. 1, a small zigzag line 20 schematically denotes communications between a base station and a mobile unit(s) located in the base station service area, while a large zigzag line 22 schematically denotes the inter-cell wireless communications. The radio communications between a base station and the mobile units are irrelevant to the present invention, and thus, the description thereof will be omitted for brevity.

In FIG. 1, there are three inter-cell wireless communication routes.

The base station antenna used for the inter-cell wireless link is a directional antenna such as a parabolic dish antenna, horn antenna, array antenna, etc having directivity in a horizontal direction and also a vertical direction.

However, the conventional cellular mobile system using the inter-cell wireless communications link has sometimes encountered the difficulty that the radio waves directed to an intended base station may undesirably reach a non-targeted (viz., non-intended) base station(s), resulting in inducing interference at the non-targeted base station. The difficulty just mentioned will be described in brief with reference to FIG. 2.

FIG. 2 is an elevation (upper portion of the drawing) and a top plan view (lower portion) of three base stations 20, 22 and 24 which are respectively provided with a pair of directional antennas 20a-20b, 22a-22b and 24a-24b. According to the conventional technique, when designing or locating the base stations, no attention has been paid to the antenna height of a given base station considering those of adjacent base stations.

As shown in FIG. 2, in the case where the heights of the base station antenna 20a-20b, 22a-22b, and 24a-24b are substantially identical, there is the possibility that the main lobe (main beam) 26 radiated from the directional antenna 20b to the antenna 22a is undesirably received at the non-targeted antenna 24a. This is because the main lobe 26 has three-dimensionally beamwidths in a plane normal to the main lobe axis. In other words, the three-dimensional field pattern of the main lobe 26 may take, for example, a shape resembling an airship (dirigible). Accordingly, even if the base station 24 is arranged on the ground in a manner not to be in line, the main lobe 26 may cause undesirably interference at the non-target base station antenna 24a.

SUMMARY OF THE INVENTION

It is therefore an object of the present invention to provide technology for designing (locating) base stations wherein the directional antennas associated therewith are positioned such as to be different in height in order to avoid interference at a non-targeted base station(s).

Another object of the present invention is to provide a method of locating the directional antennas at the base stations, which are coupled over a wireless communications link, in a manner to be different in height so as to avoid interference at a non-targeted base station(s).

In brief, these objects are achieved by the techniques wherein when locating base stations which are wirelessly coupled with each other and establish one or more inter-cell wireless relay routes in a mobile communications system, the heights of directional antennas to be installed at the base stations are determined so as to be different, which base stations are adjacent with each other in a given inter-cell wireless relay route.

One aspect of the present invention resides in a method of locating base stations which are wirelessly coupled with each other and establish one or more inter-cell wireless relay routes in a mobile communications system, characterized by determining heights of directional antennas to be installed at adjacent base stations in a given inter-cell wireless relay route such as to be different.

Another aspect of the present invention resides in a method of locating base stations which are wirelessly coupled with each other and establish one or more inter-cell wireless relay routes in a mobile communications system, comprising the steps of: (a) determining a number of base stations and location thereof in the mobile communications system; (b) determining one or more inter-cell wireless relay routes in the mobile communications system; and (c) determining heights of directional antennas to be installed at adjacent base stations in a given inter-cell wireless relay route such as to be different.

Still another aspect of the present invention resides in a computer simulation for locating base stations which are wirelessly coupled with each other and establish one or more inter-cell wireless relay routes in a mobile communications system, the improvement which comprising, determining heights of directional antennas to be installed at adjacent base stations in a given inter-cell wireless relay route such as to be different.

Still another aspect of the present invention resides in a computer simulation for locating base stations which are wirelessly coupled with each other and establish one or more inter-cell wireless relay routes in a mobile communications system, the improvement which comprises the steps of: (a) determining a number of base stations and location thereof in the mobile communications system; (b) determining one or more inter-cell wireless relay routes in the mobile communications system; and (c) determining heights of directional antennas to be installed at adjacent base stations in a given inter-cell wireless relay route such as to be different.

Still another aspect of the present invention resides in a computer program product in a computer readable media for use in locating base stations which are wirelessly coupled with each other and establish one or more inter-cell wireless relay routes in a mobile communications system, the computer program product comprising: instructions for determining heights of directional antennas to be installed at adjacent base stations in a given inter-cell wireless relay route such as to be different.

Still another aspect of the present invention resides in a computer program product in a computer readable media for use in locating base stations which are wirelessly coupled with each other and establish one or more inter-cell wireless relay routes in a mobile communications system, the computer program produce comprising: (a) instructions for determining a number of base stations and location thereof in the mobile communications system; (b) instructions for determining one or more inter-cell wireless relay routes in the mobile communications system; and (c) instructions for determining heights of directional antennas to be installed at adjacent base stations in a given inter-cell wireless relay route such as to be different.

BRIEF DESCRIPTION OF THE DRAWINGS

The features and advantages of the present invention will become more clearly appreciated from the following description taken in conjunction with the accompanying drawings in which like elements or portions are denoted by like reference numerals and in which.

DETAILED DESCRIPTION OF THE PREFERRED EMBODIMENTS

Figure 1:
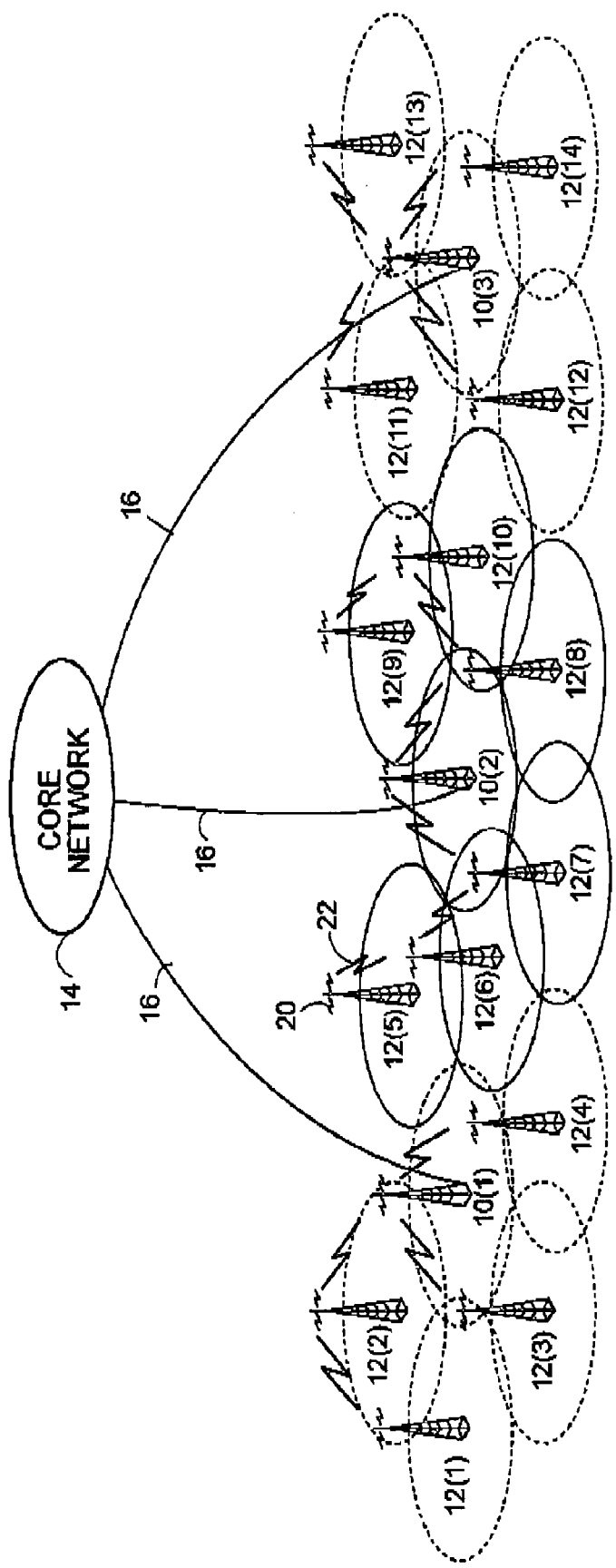
FIG. 1 is a diagram schematically showing one example of a plurality of service areas respectively covered by base stations which are wirelessly coupled in accordance with prior art, having been referred to in the opening paragraphs.

The present invention finds an extensive use in effective reduction of radio wave interference at a non-targeted base station(s) in a cellular mobile communications system wherein the base stations are wirelessly coupled with each other as shown in FIG. 1.

One embodiment of the present invention will be described with reference to FIGS. 3 and 4. The key of the embodiment resides in the fact that the directional antennas, which are respectively provided at the adjacent (neighboring) base stations coupled wirelessly with each other, are positioned such as to be different in height.

Figure 2:
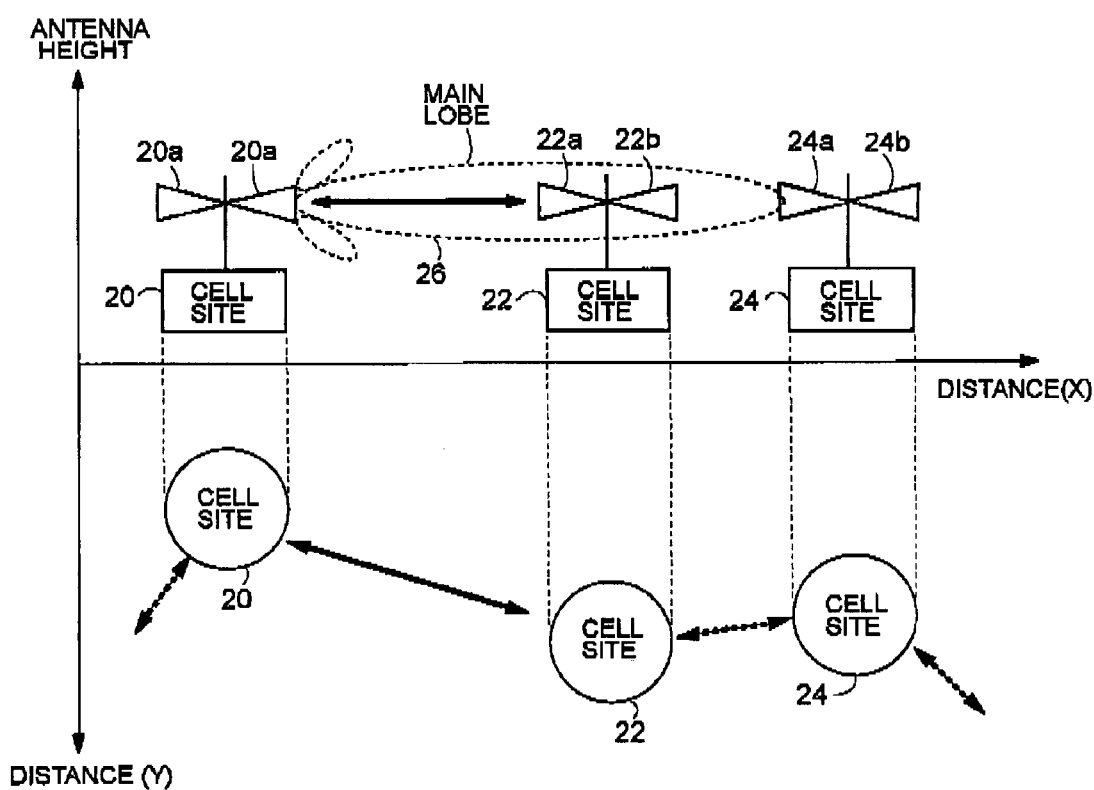
FIG. 2 schematically shows three adjacent base stations which are respectively provided with directional antennas mounted substantially at an identical height.
Figure 3:
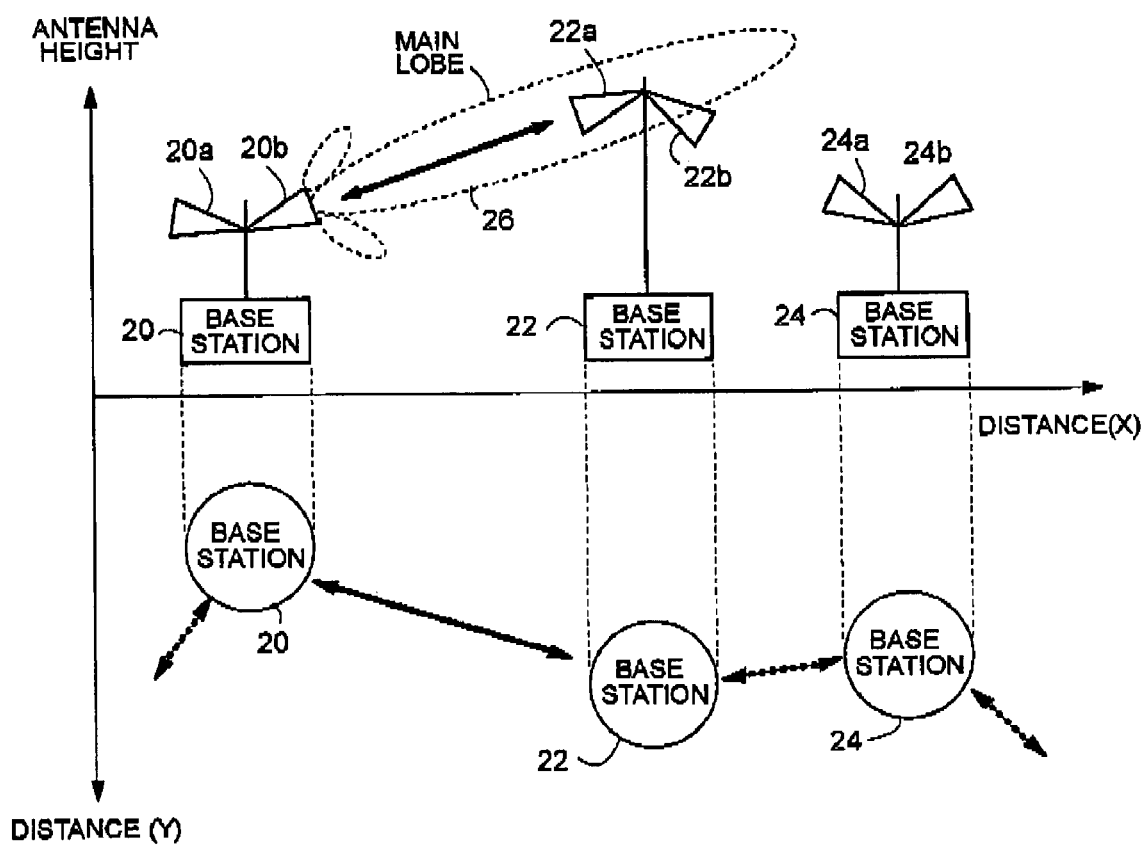
FIG. 3 schematically shows one embodiment of the present invention wherein three adjacent base stations which are respectively provided with directional antennas mounted at different heights.

FIG. 3 is identical to FIG. 2 except that (a) the antennas at the adjacent base stations are different in terms of height and (b) the antennas are tilted so as to face the adjacent base station antennas, and as such, the portions in FIG. 3, which correspond to those in FIG. 2, are denoted by the same reference numbers as in FIG. 2 for the sake of simplifying the disclosure.

As shown in FIG. 3, the heights of the directional antennas 20a-20b, 22a-22b and 24a-24b are made different with respect to those at the adjacent base stations. In order to meet the different antenna heights at the adjacent base stations, the directional antennas are tilted so as to face the adjacent antennas (viz., so as to have the directivity thereof toward the adjacent antennas). It is understood from FIG. 3 that the main lobe 26 radiated from the directional antenna 20b no longer reaches the non-targeted antenna 24a. This is applicable to the other directional antennas 20a, 22b and 24a-24b.

Figure 4:
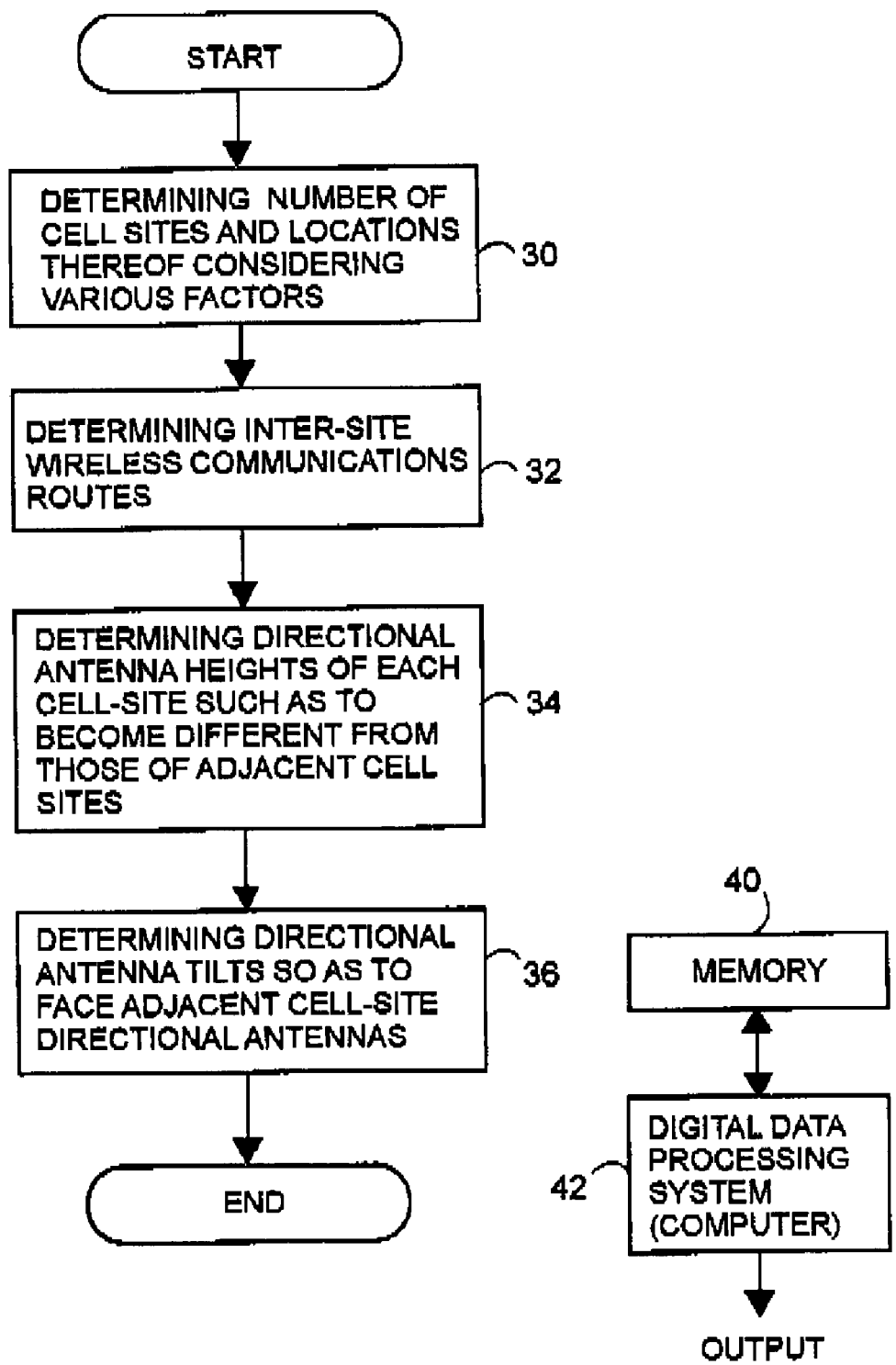
FIG. 4 is a flow chart which includes the steps which characterize the embodiment when locating base stations according to the present invention.

Referring to FIG. 4, the determination of base station antenna heights will further be described which is carried out, by way of computer simulations, during the process of designing a cellular mobile system.

As shown in FIG. 4, at step 30, the number of base stations and the locations thereof are determined based on a variety of factors such as transmission power of each base station, the transmission power of mobile terminals located in each prospective service area, a maximum predicted number of calls, cell sizes, dead spots in each cell, radio wave propagation characteristics depending on terrain and man-made conditions, etc.

The operations at step 30 will also be implemented, in addition to newly establishing the cellular mobile system, when adding a new base station(s) to the existing service areas or when splitting a busy original cell into smaller ones.

At step 32, one or more inter-cell wireless communications routes are determined, which includes the determination of one or more core base stations which are directly coupled to the core network by way of optical fiber cables (for example) and also coupled wirelessly to the adjacent base stations, as shown in FIG. 1. The wireless routes are typically established from economical point of view in the range of not deteriorating the wireless transmission quality.

Subsequently, at step 34, the directional antenna height of each base station is determined for every wireless route (determined at step 32) such as to be different from those at the adjacent base stations. The determination of the antenna heights at step 34 is implemented considering the elevations of base station's geographic locations, the heights of antenna poles or towers, the main beams (lobes) of each directional antenna, the possibility of interference at non-targeted antennas, etc.

Finally, at step 36, the directional antenna's tilts are determined so that the directional antennas at different heights are respectively directed to the counterparts at the adjacent base stations.

In the above, in the case where each of the directional antennas for use in the inter-cell wireless connection is installed in close vicinity to the base station mobile-access antenna (viz., base station antenna used for communications with mobile units), if the service coverage is expected to undesirably change (leading to the increase in weak or dead spots) due to the temporally determined directional antenna heights, it is necessary for the routine to go back to step 34 so as to re-determine the directional antenna heights or return to step 30 (if necessary). On the contrary, if each directional antenna for use in the inter-cell wireless connection is installed far from the base station mobile-access antenna, the aforesaid re-determination of the directional antenna heights may be deemed unnecessary.

A computer program for implementing the above-mentioned simulation at steps 30, 32, 34 and 36 is stored in an appropriate storage 40 such as a floppy-disk, hard disk, etc., which is operatively coupled to a computer 42. Further, the various factors mentioned at step 30 are also stored in the memory 40. The computer 42 carries out the simulation and outputs the simulation results indicating the location of the base stations, the wireless routes, the base station directional antenna heights, the antenna tilts, etc.

The foregoing descriptions show one preferred embodiment. However, other various modifications are apparent to those skilled in the art without departing from the scope of the present invention which is only limited by the appended claims. Therefore, the embodiments and modification shown and described are only illustrated, not restrictive.

What is claimed is:

1. A method of locating base stations which are wirelessly coupled with each other and establish one or more inter-cell wireless relay routes in a mobile communications system, the method comprising:
    determining heights of directional antennas to be installed at adjacent base stations in a given inter-cell wireless relay route;
    whereby the height of each directional antenna differs from that installed at an adjacent base station in the given inter-cell wireless relay route;
    wherein the directional antenna at a given base station is tilted so as to face a directional antenna to be installed at an adjacent base station.

2. The method as claimed in claim 1, wherein a computer is used to determine the heights of the directional antennas.

3. A method of locating base stations which are wirelessly coupled with each other and establish one or more inter-cell wireless relay routes in a mobile communications system, the method comprising:
    (a) determining a number of base stations and location thereof in the mobile communications system;
    (b) determining one or more inter-cell wireless relay routes in the mobile communications system; and
    (c) determining heights of directional antennas to be installed at adjacent base stations in a given inter-cell wireless relay route;
    whereby the height of each directional antenna differs from that installed at an adjacent base station in the given inter-cell wireless relay route.

4. The method as claimed in claim 3, wherein the directional antenna at a given base station is tilted so as to face a directional antenna to be installed at an adjacent base station.

5. The method as claimed in claim 4, wherein if a mobile service area is changed due to the determination of the directional antenna heights at step (c), operations at steps (a) and (b) are repeated.

6. The method as claimed in claim 3, wherein if a mobile service area is changed due to the determination of the directional antenna heights at step (c), operations at steps (a) and (b) are repeated.

7. The method as claimed in claim 3, wherein the heights of the directional antennas are determined by using a computer.

8. In a simulation for locating base stations which are wirelessly coupled with each other and establish one or more inter-cell wireless relay routes in a mobile communications system, the simulation comprising:
    (a) determining a number of base stations and location thereof in the mobile communications system;
    (b) determining one or more inter-cell wireless relay routes in the mobile communications system; and
    (c) determining heights of directional antennas to be installed at adjacent base stations in a given inter-cell wireless relay route;
    whereby the height of each directional antenna differs from that installed at an adjacent base station in the given inter-cell wireless relay route.

9. In the simulation as claimed in claim 8, wherein the heights of the directional antennas are determined by using a computer.

10. A computer program product in a computer readable media for use in locating base stations which are wirelessly coupled with each other and establish one or more inter-cell wireless relay routes in a mobile communications system, the computer program product comprising: instructions that, when executed on a computer, causes the computer to perform steps comprising:
    determining heights of directional antennas to be installed at adjacent base stations in a given inter-cell wireless relay route;
    whereby the height of each directional antenna differs from that installed at an adjacent base station in the given inter-cell wireless relay route; and
    wherein the directional antenna at a given base station is tilted so as to face a directional antenna to be installed at an adjacent base station.

11. The computer program product as claimed in claim 10, wherein the heights of the directional antennas are determined by using a computer.

12. A computer program product in a computer readable media for use in locating base stations which are wirelessly coupled with each other and establish one or more inter-cell wireless relay routes in a mobile communications system, the computer program product comprising:
    (a) instructions for determining a number of base stations and location thereof in the mobile communications system;
    (b) instructions for determining one or more inter-cell wireless relay routes in the mobile communications system; and
    (c) instructions for determining heights of directional antennas to be installed at adjacent base stations in a given inter-cell wireless relay route;
    whereby the height of each directional antenna differs from that installed at an adjacent base station in the given inter-cell wireless relay route.

13. The computer program product as claimed in claim 12, wherein the directional antenna at a given base station is tilted so as to face a directional antenna to be installed at an adjacent base station.

14. The computer program product as claimed in claim 13, wherein if a mobile service area is changed due to the determination of the directional antenna heights at the instruction (c), operations at the instructions (a) and (b) are repeated.

15. The computer program product as claimed in claim 12, wherein if a mobile service area is changed due to the determination of the directional antenna heights at the instruction (c), operations at the instructions (a) and (b) are repeated.

16. The computer program product as claimed in claim 12, wherein the heights of the directional antennas are determined by using a computer.

* * * * *